Aug. 4, 1925.
L. PAGE
SHUTTER RELEASE HOLDER
Filed Jan. 19, 1924
1,548,481
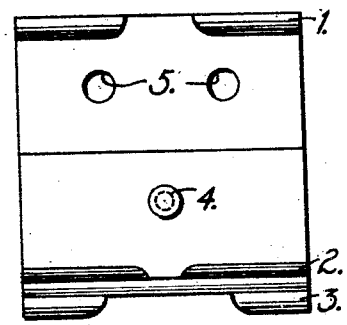
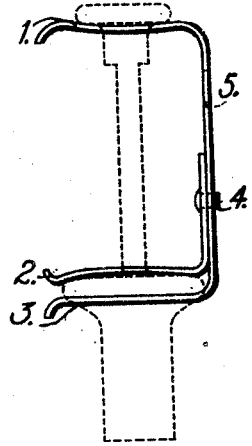
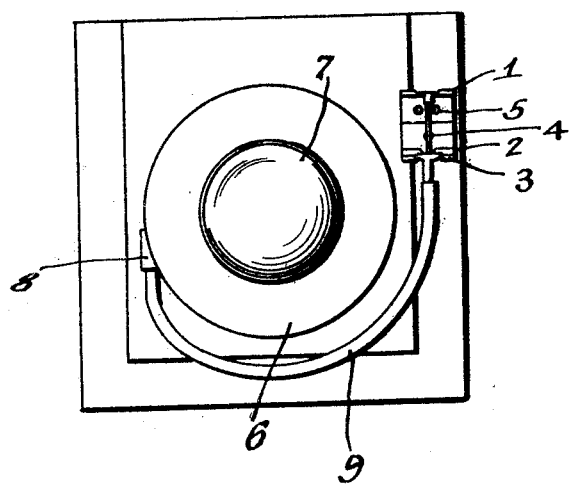
INVENTOR
Larrovel Page Patented Aug. 4, 1925.

1,548,481

UNITED STATES PATENT OFFICE.

LARRANCE PAGE, OF BERKELEY, CALIFORNIA.

SHUTTER-RELEASE HOLDER.

Application filed January 19, 1924. Serial No. 687,212.

*To all whom it may concern:*

Be it known that I, LARRANCE PAGE, a citizen of the United States, residing at Berkeley, in the county of Alameda and State of California, have invented a new and useful Shutter-Release Holder, of which the following is a specification.

My invention is a holder for that form of shutter release known as the antinous release or the cable release or the push-cord release. It is known by all these names now in common use on nearly all folding cameras and larger ones.

In the drawing forming a part of this application, Figure 1 is a front view of the holder, greatly enlarged; Figure 2 is a side view of the holder with the handle of the release in place as shown by the dotted lines; Figure 3 is a camera front showing the holder attached to the left side, with the release in place in the holder. Figure 3 also shows the relation of the release and the holder to the lens and the shutter.

The holder is made of three pieces of material, two pieces of spring sheet metal and a rivet to hold these two pieces together. The larger piece whose ends are shown by 1 and 3, is bent near both ends at right angles and these bent ends, 1 and 3, are slotted. The slot in the upper end 1 is to receive and hold the button of the release, as shown in Figure 2. The slot in the lower end of the same piece receives and holds the neck of the handle of the release, as shown at 3, Figure 2. The other piece of sheet metal is bent at right angles and one end, shown at 2, is slotted. The two slotted ends, 2 and 3, clamp and hold the handle of the release as shown in Figure 2. This handle is usually disk shaped with a central stem for attaching to the cord. The slots divide the two ends forming four curved spring fingers, Figure 1, which grip and hold the release handle firmly. The outer ends of these fingers are curved apart for convenience in inserting the release handle. The slotted upper end 1 forms a pair of fingers for holding the release button, as stated above. This pair of fingers is curved downward at the ends for convenience in inserting the button. The two pieces of sheet metal shown at 4 as riveted together, may be held by being brazed or soldered. The straight parts of these two pieces of metal form a yoke between the two ends, this yoke being shown at O in the drawing.

The holder is to be fastened by means of rivets or screws to some part of the camera front, preferably at the left as shown by Figure 3. However the location may depend upon the length of the release and the point of attachment 8 of the release 9 and the shutter 6. The numeral 5 indicates the holes for screws or rivets.

As far as I know, no form of holder for any kind of shutter release has ever been made or described.

I claim:

1. A shutter release holder consisting of two pairs of spring fingers substantially parallel, their extremities curved toward each other, the said fingers adapted to pass between the handle and the button of a shutter release and press the same in opposite directions, and a suitable yoke to connect said fingers.

2. A shutter release holder consisting of two pairs of opposing spring fingers, said pairs of fingers being curved toward each other at their extremities and a yoke connecting said pairs of fingers.

3. A shutter release holder consisting of two pairs of opposing spring fingers, said fingers having approximately straight portions adapted to hold a disk shaped object, and having extremities curved in opposite directions, and a third pair of spring fingers with extremities curved toward the said two pairs of spring fingers all of said pairs of fingers being connected by a yoke.

4. A shutter release holder consisting of two pairs of opposing spring fingers having oppositely curved extremities, a third pair of spring fingers having downwardly curved extremities, a yoke connecting the said pair of fingers and means for attaching to a camera front, substantially as described.

LARRANCE PAGE.